United States Patent [19]

Ewen

[11] Patent Number: 4,522,982
[45] Date of Patent: Jun. 11, 1985

[54] ISOTACTIC-STEREOBLOCK POLYMERS OF ALPHA-OLEFINS AND PROCESS FOR PRODUCING THE SAME

[75] Inventor: John A. Ewen, Houston, Tex.

[73] Assignee: Exxon Research & Engineering Co., Florham Park, N.J.

[21] Appl. No.: 501,588

[22] Filed: Jun. 6, 1983

[51] Int. Cl.$^3$ .................. C08F 110/06; C08F 4/64
[52] U.S. Cl. ..................... 525/240; 526/160; 526/351
[58] Field of Search ............. 526/138, 160, 170, 351; 525/240

[56] References Cited

U.S. PATENT DOCUMENTS

| | | | |
|---|---|---|---|
| 3,258,455 | 6/1966 | Nolta et al. | 526/351 |
| 3,303,177 | 2/1967 | Nolta et al. | 526/351 |
| 4,404,344 | 9/1983 | Sinn et al. | 526/351 |

FOREIGN PATENT DOCUMENTS 0069951  1/1983  European Pat. Off. ............ 526/160

OTHER PUBLICATIONS

Sinn et al., Advances in Organometallic Chemistry, vol. 18, (1980), pp. 137–143.
John A. Ewen, "Mechanisms of Stereochemical Control in Propylene Polymerizations with Soluble Group 4B Metallocene/Methylalumoxane Catalysts", 1984, pp. 6355–6364, *J. Am. Chem. Soc.*, 106.
Lynn W. Jelinski, "Modern NMR Spectroscopy", Nov. 5, 1984, pp. 26–46, *Chemical & Engineering News*.
Jens Herwig and Walter Kaminsky, "Halogen-Free Soluble Ziegler Catalysts with Methylalumoxan as Catalyst", Polymer Bulletin 9, 464–469, (1983).

*Primary Examiner*—Edward J. Smith
*Attorney, Agent, or Firm*—M. B. Kurtzman

[57] ABSTRACT

Isotactic-stereoblock polypropylene comprising recurring polypropylene units, said isotactic-stereoblock polypropylene characterized by comprising alternating blocks of monomers having an average block length greater than 2 having methine carbons with the same relative configuration and wherein the methine carbon atoms in adjacent blocks are of opposite configuration.

11 Claims, 1 Drawing Figure

ISOTACTIC-STEREOBLOCK POLYMERS OF ALPHA-OLEFINS AND PROCESS FOR PRODUCING THE SAME

This invention relates to polymers of alpha-olefins and to processes for preparing the same. More particularly, the invention relates to a new form of polyalphaolefin which is linear, substantially head-to-tail, isotactic-stereoblock polymers of alpha-olefins, and to methods for obtaining the same; said polymers having unique, unusual, and desirable properties. The invention especially relates to polypropylene isotactic-stereoblock polymers and the process and catalyst systems employed for obtaining the isotactic-stereoblock polymers and especially polypropylene isotactic-stereoblock polymers.

The new isotactic-stereoblock alpha-olefin polymers of the invention consist essentially of isotactic segments or blocks wherein each block or segment consists of a stereoregular sequence of monomeric units, the tertiary carbon atoms of each segment or stereoblock having the same configuration and, the tertiary carbon atoms of adjacent segments or blocks being of the opposite configuration.

The polymers of this invention are prepared by polymerizing an alpha-olefin in the presence of a catalyst prepared from at least a cyclopentadienyl compound or derivative thereof of a metal of Groups 4b, 5b and 6b of Periodic Table (56th Edition of Handbook of Chemistry and Physics, CRC Press (1975)) such as titanium, vanadium, and hafnium, and an alumoxane under polymerization conditions described hereinafter and working up the crude polymerizate to recover the isotactic-stereoblock polymers therefrom.

DESCRIPTION OF THE PRIOR ART

In a series of patents, G. Natta et al describe poly alpha-olefin polymerizates obtained by polymerizing a single alpha-olefin such as propylene in the presence of a catalyst prepared from a compound of a transition metal of the 4th, 5th, and 6th Groups of the Periodic Table and a compound of a metal of the 2nd or 3rd Groups of the Periodic Table. G. Natta et al employ heterogeneous catalysts in preparing the polymerizates. In U.S. Pat. No. 3,112,300, there is disclosed and claimed high molecular weight polypropylene consisting essentially of isotactic polypropylene. In U.S. Pat. No. 3,112,301, there is disclosed and claimed polypropylene consisting essentially of polypropylene which is insoluble in boiling ethyl ether and made up of macromolecules which show the isotactic stereoregular structure and which consists prevailingly of isotactic macromolecules. In U.S. Pat. No. 3,175,999, there is disclosed and claimed substantially linear, substantially homogeneous head-to-tail stereoisomer block polymers of a single alpha-olefin such as propylene, said stereoisomer block polymers characterized in that they consist of macromolecules containing (A) crystallizable isotactic sections and (B) non-crystallizable atactic sections. In U.S. Pat. No. 3,714,344, there is disclosed and claimed normally solid polypropylene consisting essentially of recurring polypropylene units having a substantial crystalline polypropylene content.

A. Zambelli, D. Natta and I. Pasquon in J. Polymer Science, C4, 411 (1963) and Y. Doi et al in Macromolecules, 12, 814 (1979) disclose syndiotactic polypropylene produced at low temperatures in the presence of vanadium containing homogeneous catalysts such as vandadium complexes formed from vanadium triacetylacetonate and $VCl_4$ in combination with an organoaluminum cocatalyst.

It is further known that certain metallocenes such as bis(cyclopentadienyl)titanium and zirconium dialkyls in combination with an aluminum alkyl cocatalyst form homogeneous catalyst systems for the polymerization of ethylene. For example, German patent application No. 2,608,863 discloses the use of a catalyst system for the polymerization of ethylene consisting of bis(cyclopentadienyl)titanium dialkyl, aluminum trialkyl and water. German patent application No. 2,608,933 discloses an ethylene polymerization catalyst system consisting of (1) zirconium metallocenes of the general formula (cyclopentadienyl)$_n$ZrY$_{4-n}$, wherein n stands for a number in the range of 1 to 4, Y for R, $CH_2AlR_2$, $CH_2CH_2AlR_2$ and $CH_2CH(AlR_2)_2$, and R stands for alkyl or metallo alkyl; (2) an aluminum trialkyl cocatalyst and (3) water.

European patent appln. No. 0035242 discloses a process for preparing ethylene and atactic propylene polymers in the presence of a halogen-free Ziegler catalyst system of (1) a cyclopentadienyl compound of the formula (cyclopentadienyl)$_n$MeY$_{4-n}$ in which n is an integer from 1 to 4, Me is a transition metal, especially zirconium, and Y is either hydrogen, a $C_1$-$C_5$ alkyl or metallo alkyl group or a group of the general formula: $CH_2AlR_2$, $CH_2CH_2AlR_2$ and $CH_2CH(AlR_2)_2$ in which R represents a $C_1$-$C_5$ alkyl or metallo alkyl group, and (2) an alumoxane.

Heretofore, it has not been disclosed that crystalline stereoregular polypropylene can be obtained by polymerizing propylene in the presence of a homogeneous catalyst system comprising a metallocene and an alumoxane.

SUMMARY OF THE INVENTION

It will be appreciated by those skilled in the art that polypropylene has heretofore been prepared in various forms. The forms which are well known to those of skill in the art are isotactic, syndiotactic, atactic and isotactic-atactic-stereoblock. This latter material was defined by Natta et al, as consisting of segments of isotactic polypropylene and segments of atactic polypropylene within the same chain.

Heretofore, however, isotactic-stereoblock polypropylene consisting essentially of segments of stereoregular polypropylene, wherein each of the tertiary carbon atoms in adjacent segments of any particular chain have the opposite configuration, have not been produced. This material differs from isotactic polypropylene structures which consists of stereoregular segments in each chain having the same configuration.

Furthermore, it has been shown that only atactic polypropylene has been produced in the presence of a homogeneous catalyst system comprising a metallocene and alumoxane (P. Pino and R. Mulhaupt, Angew Chem. Int. Ed. Engl., 19, 857 (1980)).

In accordance with the present invention, there is provided polymer product of normally solid isotactic-stereoblock polypropylene comprising recurring polypropylene units or blocks; said isotactic-stereoblock polypropylene characterized in comprising stereoregular blocks, wherein the tertiary carbon atoms in adjacent blocks are of opposite configuration.

The stereoblock polypropylenes of this invention obtain the stereoregular structure represented by

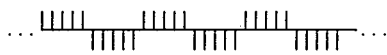
(I)

as contrasted with the isotactic structure found in the heptane insoluble fraction of commercial polypropylene represented by

(II)

and syndiotactic polypropylene represented by

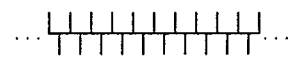
(III)

wherein the vertical upwards lines of (I), (II) and (III) represent methyl groups attached to a tertiary carbon atom of one particular configuration, the vertical lines downward represent methyl groups attached to a tertiary carbon atom with the opposite configuration and the horizontal line represents the backbone repeating units of polypropylene.

The normally solid isotactic-stereoblock polypropylenes of this invention are obtained by polymerizing propylene in the presence of a homogeneous catalyst system comprising an alumoxane and a metallocene at temperatures of less than about 0° C.

The properties of the isotactic-stereoblock polypropylenes of this invention are very different from those of the prior art polypropylenes.

For example, depending on the degrees of stereoregularity and molecular weight of the polymers desired, they can be soluble or insoluble in organic solvents and be elastomeric with low melting points or highly crystalline with high melting points. These properties can be varied by changing the reaction conditions (concentrations, times and temperatures) or the nature of the transition metal ligands. For example, polymers have been prepared which have melting points ranging from about 50° C. (and which are soluble in organic solvents) up to about 145° C. (and which are insoluble in organic solvents). Polymer molecular weights have also been varied from about 200 to over a million. The polymer's appearance changes from a sticky material to an elastomeric material, to a hard crystalline insoluble material as the molecular weights and degrees of stereoregularity are increased.

DETAILED DESCRIPTION OF THE INVENTION

Figure 1:
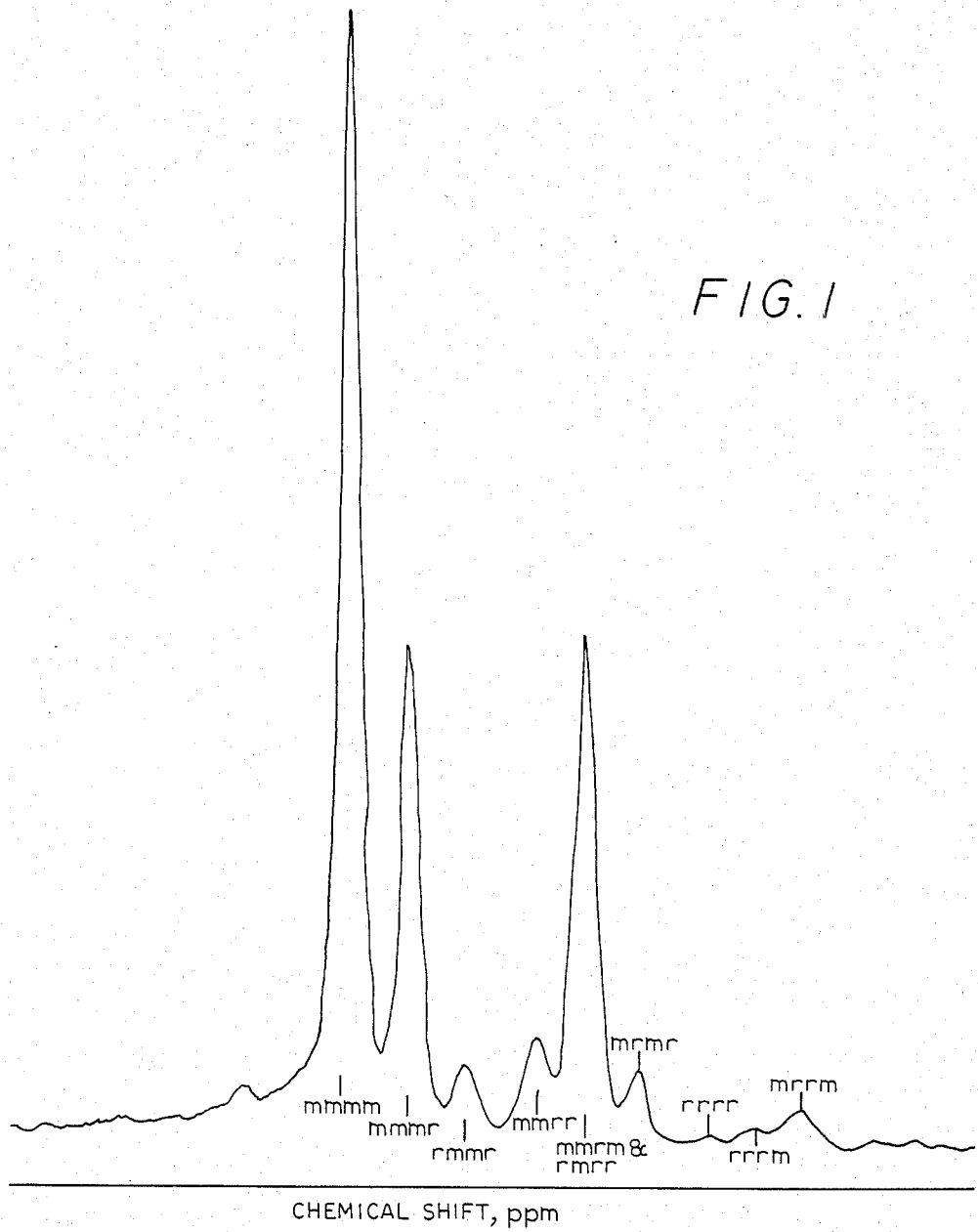
FIG. 1 is a $^{13}$C-NMR of the methyl pentad region of the isotactic-stereoblock polypropylene of the invention.

Normally, when propylene is polymerized with the aid of a catalyst system prepared from a transition metal compound such as, for example, titanium trichloride and a organometallic compound, such as, for example, aluminum alkyl halides, the propylene polymerizate comprises a mixture from which there can be obtained, by extraction with suitable solvents, some atactic amorphous polymers and crystalline isotactic fractions.

Suprisingly, it has been discovered that isotactic-stereoblock polypropylene polymerizates comprising recurring propylene units and characterized in comprising blocks of isotactic macromolecules wherein the tertiary carbon atoms, in adjacent blocks, are of opposite configuration, are readily obtained by polymerizing propylene in the presence of a homogeneous catalyst system at temperatures of less than about 0° C.

The homogeneous catalyst systems employed in accordance with this invention comprises an alumoxane and a metallocene or metallocene derivative, and especially titanium, vanadium and hafnium metallocenes.

The metallocenes are organometallic coordination compounds which are cyclopentadiene derivatives of a transition metal of Group 4b, 5b and 6b and include mono, di and tricyclopentadienyls and their derivatives.

The aluminum-containing compounds of the alumoxane type can be represented by the general formulae $(R-Al-O)_n$, which is a cyclic alumoxane and $R(R-Al-O-)_nAlR_2$, which is a linear alumoxane. In the general formula R is a $C_1-C_5$ alkyl group such as for example, methyl, ethyl, propyl, butyl and pentyl and n is an integer from 1 to about 20. Most preferably R is methyl. Generally, in the preparation of alumoxanes from, for example, aluminum trimethyl and water, a mixture of the linear and cyclic compounds are obtained.

The alumoxanes can be prepared in various ways. Preferably, they are prepared by contacting solutions of aluminum trialkyl, such as, for example, aluminum trimethyl, in a suitable organic solvent such as toluene or an aliphatic hydrocarbon with water. For example, the aluminum alkyl is treated with water in the form of a moist solvent or the aluminum trialkyl such as aluminum trimethyl is desirably contacted with a hydrated salt such as hydrated copper sulfate.

Preferably, the alumoxane is prepared in the presence of a hydrated copper sulfate. The method comprises treating a dilute solution of aluminum trimethyl in, for example, toluene, with copper sulfate represented by the general formula $CuSO_4.5H_2O$. The ratio of hydrated copper sulfate to aluminum trimethyl is desirably about 1 mole of copper sulfate for 5 moles of aluminum trimethyl. The reaction is evidenced by the evolution of methane.

The metallocenes usefully employed in accordance with this invention are the mono, bi and tricyclopentadienyl or substituted cyclopentadienyl metal compounds. The metallocenes can be represented by the general formulae $(C_5R'_m)_pR''_s(C_5R'_m)MeQ_{3-p}$ and $R''_s(C_5R'_m)_2MeQ'$ wherein $(C_5R'_m)$ is a cyclopentadienyl or substituted cyclopentadienyl, each R' is the same or different and is hydrogen or a hydrocarbyl radical such as alkyl, alkenyl, aryl, alkylaryl or arylalkyl radicals containing from 1 to 20 carbon atoms or two adjacent carbon atoms are joined together to form a $C_4-C_6$ ring, R'' is a $C_1-C_4$ alkylene radical, a dialkyl germanium or silicone, or an alkyl phosphine or amine radical bridging two $(C_5R'_m)$ rings, Q is a hydrocarbyl radical such as aryl, alkyl, alkenyl, alkylaryl or arylalkyl radical having from 1-20 carbon atoms or halogen and can be the same or different, Q' is a alkylidene radical having from 1 to about 20 carbon atoms, Me is a group 4b, 5b, and 6b metal from the Periodic Table ((56th Edition of Handbook of Chemistry and Physics, CRC Press (1975)) s is 0 or 1, p is 0, 1 or 2, when p is 0, s is 0, and m is 4 when s is 1 and m is 5 when s is 0.

Exemplary hydrocarbyl radicals methyl, ethyl, propyl, butyl, amyl, isoamyl, hexyl, isobutyl, heptyl, octyl, nonyl, decyl, cetyl, 2-ethylhexyl, phenyl, and the like.

Exemplary alkylene radicals are methylene, ethylene, propylene, and the like.

Exemplary halogens atoms includes chloride, bromine and iodine; and of these halogen atoms, chlorine is preferred.

Exemplary of the alkylidene radicals is methylidene, ethylidene and propylidene.

Illustrative examples of the metals are titanium, vanadium and hafnium. Especially preferred is titanium.

Illustrative but nonlimiting examples of titanocenes which can be usefully employed in accordance with this invention are bis(cyclopentadienyl)titanium diphenyl, the carbene represented by the formula $Cp_2Ti=CH_2 \cdot Al(CH_3)_2Cl$ (the Tebbe reagent), and derivatives of this reagent such as $Cp_2Ti=CH_2 \cdot Al(CH_3)_3$, $(Cp_2TiCH_2)_2$,

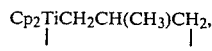

$Cp_2Ti=CHCH_2CH_2$, $Cp_2Ti=CH_2AlR'''_2Cl$, wherein Cp is a cyclopentadienyl or substituted cylopentadienyl radical, and $R'''$ is an alkyl, aryl or alkylaryl radical having from 1-18 carbon atoms; substituted $(Cp)_2Ti(IV)$ compounds such as bis(indenyl)Ti diphenyl or dichloride, bis(methylcyclopentadienyl)Ti diphenyl or dihalides and other dihalide complexes; dialkyl, trialkyl, tetra-alkyl and penta-alkyl cyclopentadienyl titanium compounds such as bis(1,2-dimethylcyclopentadienyl)Ti diphenyl or dichloride, bis(1,2-diethylcyclopentadienyl)Ti diphenyl or dichloride and other dihalide complexes; silicone, phosphine, amine or carbon bridged cyclopentadiene complexes, such as dimethyl silyldicyclopentadienyl titanium diphenyl or dichloride, methyl phosphine dicyclopentadienyl titanium diphenyl or dichloride, methylenedicyclopentadienyl titanium diphenyl or dichloride and other dihalide complexes and racemic ethylenebis(4,5,6,7-tetrahydroindenyl)titanium dichloride, bis(cyclopentadienyl)titanium dichloride, and bis(cyclopentadienyl)vanadium dichloride.

The polymerization can be effected within a broad range of temperatures, however, the isotactic-stereoblock polymers of this invention will be more stereoregular when obtained at polymerization temperatures of about 0° C. and lower. Preferably the polymerization temperatures will be in the range of about −60° C. to about 0° C. and preferably −10° C. to about −60° C. Lower and higher temperatures can be employed.

Generally, the number of repeating units in a block will be greater with lower polymerization temperatures.

The block length of the polymers will be greater than 2. Average block length of about 3 to 50 can be obtained through temperature control, i.e. higher block length with lower polymerization temperatures. Average block lengths of about 5 to 17 and greater result in polymers having most desirable properties.

The alumoxane-titanocene catalyst system employed in accordance with the present invention is suitable for polymerization in solution. In a solution phase polymerization the alumoxane is preferably dissolved in a suitable solvent, typically an hydrocarbon solvent such as propylene, hexane, toluene, xylene and the like in molar concentrations of about $5 \times 10^{-3} M$ to about 1M. However greater or lesser amounts can be employed.

In the examples following the molecular weights were determined on a Water's Associates Model No. 150c Gel Permeation Chromotography (GPC). The measurements were made by dissolving polymer samples in hot trichlorobenzene (TCB) and filtered. The GPC runs were performed at 140° C. in TCB at 1.5 ml/min using a mixed bed Jordi Gel column of 9.4 mm internal diameter (II) by 50 cm long from Jordi Associates Inc. 300 microliter of 3.1 percent solutions in TCB were injected and the chromotagraphic runs monitored at sensitivity equal −64 and scale factor equal 90. The samples were run in duplicate. The integration parameters were obtained with a Water's Associates data module. An antioxidant, N-phenyl-2-naphthylamine, was added to all samples.

The configuration of the polypropylene samples were determined by the $^{13}$C-NMR spectroscopy. C-13 NMR spectra of polypropylene samples were recorded at 135° C. in 1, 2, 4-trichlorobenzene (wt/vol. ratio=10–20%), using a Varian XL-200 spectrometer with a Fourier transform system operating at 50 MHz. Instrument conditions were 60° pulse, 6.0 s repetion rate, and 10,000 Hz sweep width. The number of transients accumulated was 5000.

In NMR nomenclature, two consecutive repeating polypropylene units are referred to as a dyad:

The relative configurations of the asymmetric methines are denoted m(meso) with the same relative configurations and r(racemic) with opposite relative configurations.

By analogy, three adjacent repeating units are denoted as a triad (Table I). Although rm and mr are indistinguishable (degenerate structures), their concentrations must be taken into account in analyses of the relative mr line intensities.

Similarly, there are ten pentads which are distinguishable (Table I).

The steric environments of the central methyl groups of the triads and pentads result in different degrees of shielding and, hence, unique $^{13}$C-NMR chemical shifts for the species.

The three triads and the ten pentads for the methyl groups in polypropylene have been assigned chemical shifts as described in among others each of three articles : (1) A. Zambelli et al, Macromolecules, 8, 687–689 (1975); (2) A. Zambelli et al, Macromolecules, 13, 267–270 (1980) and (3) F. C. Schilling et al, Macromolecules, 13, 270 (1980).

Other teachings regarding the $^{13}$C-NMR band assignments are shown in (4) R. A. Shelden et al, Polymer Letters, 3, 23–26 (1965) and (5) F. C. Stehling et al, Macromolecules, 8, 595–603 (1975).

The $^{13}$C-NMR spectrum in the methyl pentad region of the new stereoblock-isotactic polymer (FIG. 1) shows the mmmm, mmmr and mmrr as the most intense. The 1:1 intensity ratio for the latter two microstructures shows that the polymer has the predominant structure (I). Analysis of the entire methyl region of the polymer spectrum in a manner similar to the studies shown in A. Zamballi et al (2) and R. A. Shelden et al (4) by fitting the $^{13}$C-NMR band intensities for the methyl group pentads and triads to the Bernoullian equations as listed in Table I determined the detailed structure. In contrast to this, statistical analysis of the $^{13}$C-NMR and $^1$H-NMR spectra of polymers made with heterogeneous TiCl$_3$ based catalysts have shown these polymers to have the structure (II) as shown for example in Y. Doi et al, Die Makromolekulare Chemie., 176, 507 (1975) and reference (5) above. Similarly, polypropylene made with soluble vanadium based catalysts at low temperatures have been shown to have the syndiotactic structure (III) (reference 2).

shows, together with the measurements of the relative intensities, that the polymers of this invention have the general structure (I) and that the stereoregularity ($P_m$) can be altered with reaction conditions and catalyst structures.

EXAMPLE I

Alumoxane Preparation 600 cc of a 14.5% solution of trimethyl aluminum (TMA) in heptane was added in 30 cc increments at five minute intervals, with rapid stirring, to 200 cc toluene in Zipperclave reactor under nitrogen and maintained at 95° C. Each increment was immediately followed by the addition of 0.3 cc H$_2$O. The reactor was vented of methane after each addition. The mixture was cooled to room temperature and the clear solution containing soluble alumoxane separated by decantation from the solids. Alumoxane analysis showed that is was 0.95M in aluminum.

TABLE I

| | TRIADS | |
|---|---|---|
| DESIGNATION | PROJECTION | RELATIVE INTENSITY |
| mm | | $P_m^2$ |
| mr | | $2P_m(1-P_m)$ |
| rr | | $(1-P_m)^2$ |

| | | PENTADS | | |
|---|---|---|---|---|
| TRIAD CENTERING | DESIGNATION | PROJECTION | RELATIVE INTENSITY | CHEMICALS SHIFTS$^a$ ppm |
| mm | mmmm | | $P_m^4$ | 21.8 |
| | mmmr | | $2P_m^3(1-P_m)$ | 21.6 |
| | rmmr | | $P_m^2(1-P_m)^2$ | 21.3 |
| mr | mmrr | | $2P_m^2(1-P_m)^2$ | 21.0 |
| | mmrm rmrr | | $2P_m^3(1-P_m)$ $2P_m(1-P_m)^3$ | 20.8 |
| | rmrm | | $2P_m^2(1-P_m)^2$ | 20.7 |
| rr | rrrr | | $(1-P_m)^4$ | 20.3 |
| | rrrm | | $2P_m(1-P_m)^3$ | 20.2 |
| | mrrm | | $P_m^2(1-P_m)^2$ | 20.0 |

$^a$Chemical shifts are given relative to TMS. Band Assignments made in ref. 1 and 2.

where $P_m$ is the probability of a meso placement and is measured experimentally as the mole fraction of the m dyads. The triad test $$\frac{4(mm)(rr)}{[mr]^2} = 1$$

Propylene Polymerization

To 470 cc toluene in 1 liter stirred autoclave reactor equipped for syringe injection there was injected 50 cc of the alumoxane solution. The reactor was cooled and 5.15 mg bis(cyclopentadienyl)Ti diphenyl in 10 cc toluene was injected followed by the addition of 330 cc of liquid propylene at 25° C. The reactor was maintained at 0° C. for 6 hours. To the recovered reaction mixture there was added with constant stirring 100 cc of a solution containing 50% ethanol and 50% 4M HCl in $H_2O$. The mixture was stirred continuously until evolution of methane ceased. The aqueous layer was removed and the organic layer was evaporated to dryness. The recovered polymer was dried for eight hours under reduced pressure. 2.4 g of polymer were recovered having an average block length of 2.6 repeating units and a total of 72% meso placement. $\overline{M}n = 22,300$, /w = 47,900, Dispersity = 2.15. The NMR analysis is summarized in Table II.

EXAMPLE 2

Alumoxane Preparation

The alumoxane was prepared identically as in Example 1 except that 20 cc of TMA and 0.2 cc of water were added incrementally to the reactor maintained at 90° C. The alumoxane analysis showed that the product was 0.819M in aluminum.

Propylene Polymerization

Propylene was polmerized identically as in Example 1 with the exception that 5.45 mg of the titanocene was employed, the reactor temperature was maintained at −30° C., polymerization was run for 5 hours. 11.7 g of polymer were recovered; said polymer having an average block length of 5.3 repeating units with a total meso placement of 84%. $\overline{M}n = 122,000$, $\overline{M}w = 262,000$, Dispersity = 2.15, Melting Point = 55° C. The NMR analysis is summarized in Tables II and III. The NMR chemical shift is illustrated in FIG. I.

EXAMPLE 3

Alumoxane Preparation

The alumoxane was prepared identically as in example 2.

Propylene Polymerization

Propylene was polymerized identically as in Example 1 with the exception that 4.13 mg of the metallocene was employed, the polymerization temperature was −50° C. 5.5 g of polymer were recovered having an average block length of 5 repeating units and a total meso placement of 82%. The NMR analysis is summarized in Table II.

EXAMPLE 4

Alumoxane Preparation

To a nitrogen flushed 250 cc round bottom glass stoppered flask containing a magnetic stirring bar and 200 cc of degassed toluene there was added 9.7 cc of neat TMA with constant stirring and thereafter 5 g of $CuSO_4.5H_2O$. Methane was vented continuously. The mixture was stirred for 24 hours at 24° C. The soluble fraction was decanted off. Analysis showed an aluminum concentration of 0.23 moles per liter.

Propylene Polymerization

Propylene was polymerized identically as in Example 1 with the exception that 4.9 mg of the titanocene was employed, the polymerization temperature was −60° C., polymerization was allowed to continue for 4 hours. 18.5 g of polymer were recovered having an average block length of 5 repeating units and a total meso placement of 82%. $\overline{M}n = 63,700$, $\overline{M}w = 176,000$, Dispersity = 2.77, Melting Point = 62° C. The NMR results are summarized in Table II.

EXAMPLE 5

Alumoxane Preparation

The alumoxane was prepared identically as in Example 2.

Polymerization of Propylene

Propylene was polymerized identically as in Example 2 with the exception that 5.13 mg of the metallocene was employed, the polymerization temperature was maintained at −60° C., polymerization time was 6 hours. 12.1 g of polymer were recovered having an average block length of 5 repeating units with a total meso placement of 82%. $\overline{M}n = 650,000$, $\overline{M}w = 1,080,000$, Dispersity = 1.66. The NMR results are summarized in Table II.

EXAMPLE 6

Alumoxane Preparation 400 cc of toluene which had been passed through alumina was added to a 500 ml serum bottle and stoppered. The toluene was sparged with nitrogen for 10 minutes. 50 cc of neat TMA was injected into the toluene and 25.8 g of $CuSO_4.5H_2O$ was added all at once. The mixture was stirred with a magnetic stirrer for 24 hours and thereafter the suspension was allowed to stand quietly for 6 hours. The clear liquid was decanted from the solids. The alumoxane showed a concentration of 0.952 moles per liter of aluminum. The analysis was prepared by mixing 1 ml of the clear solution with 2 cc of concentrated sulfuric acid and a small amount of water and diluted to 100 ml with water. The solution was analyzed by Inductively Coupled Plasma Emission Spectroscopy for total Al concentration.

Propylene Polymerization

To 400 cc toluene in a 1 liter stirred autoclave reactor equipped for syringe injection there was injected 50 cc of the alumoxane solution. The reactor was cooled and 51 mg of carbene complex having the formula $Cp_2Ti=CH_2.Al(CH_3)_2Cl$, popularly known as the "Tebbe" reagent, in 10 cc toluene was injected followed by the addition of 300 cc propylene. The reactor was maintained at −30° C. for 1.5 hours. To the recovered reaction mixture there was added with constant stirring 100 cc of a solution containing 50% ethanol by volume and 50% of 4M HCl in $H_2O$. The mixture was stirred continuously until evolution of methane ceased. The aqueous layer was removed and the organic layer was evaporated to dryness. The recovered polymer was dried for eight hours at reduced pressure. 31.4 g of polymer were recovered having an average block length of 5 repeating units and a total meso placement of 83%. The NMR analysis summarized in Table II.

EXAMPLE 7

Alumoxane Preparation

The alumoxane was prepared identically as in Example 6.

Propylene Polymerization

The propylene was polymerized identically as in Example 6 with the exception that 50 mg of "Tebbe" reagent was employed, the polymerization temperature was −60° C. 11.2 g of polymer were recovered having an average block length of 6 and a total meso placement of 86%. $\overline{Mn}=182{,}000$, $\overline{Mw}=440{,}000$, Dispersity=2.42. The NMR analysis is in Table II.

EXAMPLE 8

Alumoxane Preparation

The alumoxane was prepared identically as in Example 6.

Propylene Polymerization

To 470 cc toluene in 1 liter stirred autoclave reactor equipped for syringe injection there was injected 50 cc of the alumoxane solution. The reactor was cooled and 5.44 mg of the racemic isomers of ethylene bis(4,5,6,7-tetrahydroindenyl)titanium dichloride in 10 cc toluene was injected followed by addition of 330 cc propylene. The reactor was maintained at −60° C. for 1 hour. To the recovered reaction mixture there was added with constant stirring 100 cc of a solution containing 50% ethanol and 4M HCl in H$_2$O. The mixture was stirred continuously until evolution of methane ceased. The aqueous layer was removed and the organic layer was evaporated to dryness. The recovered polymer was dried for eight hours at 70° C. and a reduced pressure. 0.15 g of polymer were recovered having an average block length of 17 repeating units and a total meso placement of 95%. The NMR analysis summarized in Table II. The polymer melting point was determined to be 144° C.

The isotactic-stereoblock polymers of this invention have molecular weights of greater than 200. Molecular weights in the range of from 200 to 1,500,000 can be readily obtained however greater molecular weights can be obtained through means well known in the art.

Molecular weight control can be readily obtained by metallocene ligand variation as described in cofiled application by Ewen and Welborn and entitled "Process and Catalyst for Polyolefin Density and Molecular Weight control" (P-987) which disclosure is incorporated herein by reference.

The isotactic-stereoblock polymers of this invention can be employed as plastics, elastomers, viscosity improvers, hot melt application adhesive, and as drag reducers. The isotactic-stereoblock polymers can be blended with other crystalline polymerse, such as isotactic polypropylene.

TABLE II

STEREOREGULARITIES OF POLYPROPYLENES ($^{13}$C NMR)

| Example | Polymerization Temp °C. | Triad[a] Fractions [mm] | [mr + rm] | [rr] | Dyad[b] Compositions [m] | [r] | $\dfrac{4[mm][rr]}{[mr]^2}$ | $\dfrac{2rr}{mr}$ | n[c] | % m[d] |
|---|---|---|---|---|---|---|---|---|---|---|
| 1 | 0 | 0.46 | 0.45 | 0.09 | 0.72 | 0.28 | 0.82 | 0.19 | 2.6 | 72 |
| 2 | −30 | 0.709 | 0.266 | 0.025 | 0.842 | 0.158 | 1.00 | 0.19 | 5.3 | 84 |
| 3 | −50 | 0.67 | 0.29 | 0.04 | 0.82 | 0.18 | 1.28 | 0.28 | 4.5 | 82 |
| 4 | −60 | 0.69 | 0.27 | 0.04 | 0.82 | 0.18 | 1.51 | 0.30 | 4.5 | 82 |
| 5 | −60 | 0.68 | 0.28 | 0.04 | 0.82 | 0.18 | 1.39 | 0.29 | 5.06 | 82 |
| 6 | −30 | 0.70 | 0.26 | 0.04 | 0.83 | 0.17 | 1.6 | 0.3 | 5 | 83 |
| 7 | −60 | 0.74 | 0.24 | 0.01 | 0.86 | 0.13 | 0.8 | 0.1 | 6 | 86 |
| 8 | −60 | 0.89 | 0.11 | 0.004 | 0.94 | 0.05 | 1.2 | 0.05 | 17 | 95 |

[a]Determined from the Methyl region of $^{13}$C NMR Spectra.
[b]Calculated from Triad fractions.
[c]$n = \dfrac{[m]}{[r]}$ = average block length
[d]% meso placements

TABLE III

Comparison of Experimental and Calculated Intensities for Polypropylene Prepared in Example 2

| Pentad | Band Intensities Experimental | Calculated | Δ[a] |
|---|---|---|---|
| m m m m | 0.485 | 0.503 | 0.018 |
| m m m r | 0.184 | 0.189 | 0.005 |
| r m m r | 0.040 | 0.018 | 0.022 |
| m m r r | 0.044 | 0.036 | 0.008 |
| m r m m } r m r r | 0.200 | 0.0189 } 0.007  } 0.196 | 0.004 |
| m r m r | 0.022 | 0.036 | 0.014 |
| r r r r | 0.0025 | 0.001 | 0.002 |
| r r r m | 0.0057 | 0.007 | 0.001 |
| m r r m | 0.0168 | 0.018 | 0.001 |
|  | 1.00 | 1.00 |  |

[a]Δ = |Experimental − Calculated|

The invention claimed is:

1. Normally solid isotactic-stereoblock polypropylene comprising recurring polypropylene units, said isotactic-stereoblock polypropylene characterized by comprising alternating blocks of monomers having an average block length greater than 2 having methine carbons with the same relative configuration and wherein the methine carbon atoms in adjacent blocks are of opposite configuration.

2. Isotactic-stereoblock polypropylene of claim 1 wherein the average block length contains from about 3 to 50 repeating units.

3. Isotactic-stereoblock polypropylene of claim 2 wherein the average block length contains from 5 to 17 repeating units.

4. Isotactic-stereoblock polypropylene of claim 1 having a molecular weight greater than 200.

5. Isotactic-stereoblock polypropylene of claim 4 which is normally solid.

6. Mixtures of crystalline polymers of an alpha-olefin with the isotactic-stereoblock polypropylene of claim 1.

7. The mixture of claim 6 wherein the crystalline polymer is isotactic polypropylene.

8. The process of polymerizing propylene to normally solid isotactic-stereoblock polypropylene, said normally solid isotactic-stereoblock polypropylene comprising alternating blocks of monomers having an average block length greater than 2 and having methine carbons with the same relative configuration and wherein the methine carbon atoms in adjacent blocks have opposite relative configurations, the process comprising polymerizing propylene in the presence of a homogeneous catalyst system comprising a metallocene and an alumoxane at a temperature of less than about 0° C.

9. The polymerization process of claim 8 wherein the metallocene is a titanocene.

10. The polymerization process of claim 9 wherein the polymerization temperature is less than about −30° C.

11. The polymerization process of claim 10 wherein the polymerization temperature is in the range of −60° C. to −30° C.

* * * * *